United States Patent
Tseng et al.

(10) Patent No.: US 10,890,710 B2
(45) Date of Patent: Jan. 12, 2021

(54) DISPLAY DEVICE AND BACKLIGHT MODULE THEREOF

(71) Applicant: AU OPTRONICS CORPORATION, Hsin-Chu (TW)

(72) Inventors: Shih-Fu Tseng, Hsin-Chu (TW); Chia-Hung Chen, Hsin-Chu (TW); Kai-Teng Shih, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/785,702

(22) Filed: Feb. 10, 2020

(65) Prior Publication Data

US 2020/0257036 A1 Aug. 13, 2020

(30) Foreign Application Priority Data

Feb. 11, 2019 (TW) .............................. 108104489 A

(51) Int. Cl.
*F21V 8/00* (2006.01)

(52) U.S. Cl.
CPC ........... *G02B 6/0061* (2013.01); *G02B 6/003* (2013.01); *G02B 6/0036* (2013.01); *G02B 6/0068* (2013.01); *G02B 6/0088* (2013.01)

(58) Field of Classification Search
CPC .... G02B 6/0061; G02B 6/003; G02B 6/0088; G02B 6/0068; G02B 6/0036;

(Continued)

(56) References Cited

U.S. PATENT DOCUMENTS

| | | | | |
|---|---|---|---|---|
| 5,779,338 A | * | 7/1998 | Ishikawa | .............. G02B 6/0025 362/23.16 |
| 6,123,431 A | * | 9/2000 | Teragaki | .............. G02B 6/0038 362/333 |

(Continued)

FOREIGN PATENT DOCUMENTS

| | | |
|---|---|---|
| CN | 103299358 A | 9/2013 |
| CN | 107329202 A | 11/2017 |
| TW | 201719251 A | 6/2017 |

*Primary Examiner* — Peggy A Neils
(74) *Attorney, Agent, or Firm* — Wpat, PC

(57) ABSTRACT

A display device and a backlight module thereof are provided. The backlight module includes a collimated light source and a light guide plate. The collimated light source configured to generate a collimated light. The light guide plate has a bottom surface and a top surface opposite to each other, and a light entrance surface connected to ends of the bottom and top surfaces respectively for receiving collimated light from the collimated light source. The bottom surface inclines toward the top surface from the end of the bottom surface connected to the light entrance surface. A plurality of first grooves are disposed side by side on the bottom surface and respectively extend along the light entrance surface. The first groove has a first light receiving surface with a first end extending toward the top surface and inclining away from the light entrance surface. Compared to the first end of the first light receiving surface closer to the light entrance surface, the first end of the first light receiving surface farther from the light entrance surface has a vertical projection position on the light entrance surface that is closer to the top surface.

14 Claims, 7 Drawing Sheets

(58) Field of Classification Search
CPC .. G02B 6/0016; G02B 6/0028; G02B 6/0046; G02B 6/0048; G02B 6/0073; G02F 1/133615
See application file for complete search history.

(56) References Cited

U.S. PATENT DOCUMENTS

| | | | |
|---|---|---|---|
| 6,497,939 B1* | 12/2002 | Obuchi | G02B 6/0038 359/321 |
| 7,750,984 B2* | 7/2010 | Ha | G02B 6/0056 349/25 |
| 7,876,489 B2* | 1/2011 | Gandhi | G02B 6/0035 359/242 |
| 8,251,561 B2* | 8/2012 | Montgomery | G02B 6/002 362/610 |
| 9,400,347 B2 | 7/2016 | Sugiyama et al. | |
| 2007/0139935 A1* | 6/2007 | Kim | G02B 6/0016 362/362 |
| 2008/0055515 A1 | 3/2008 | Ha et al. | |
| 2008/0285984 A1 | 11/2008 | Hughes | |
| 2010/0059767 A1 | 3/2010 | Kawasaki et al. | |
| 2013/0051076 A1* | 2/2013 | Mizuno | G02B 6/0046 362/613 |
| 2018/0149914 A1* | 5/2018 | Lee | G02F 1/133514 |

* cited by examiner

DISPLAY DEVICE AND BACKLIGHT MODULE THEREOF

BACKGROUND

Technical Field

The present invention relates to a backlight module and a display device using the backlight module. Specifically, the present invention relates to a backlight module capable of providing collimated backlight and a display device using the backlight module.

Related Art

Flat and curved display devices have been widely used in various electronic apparatuses such as mobile phones, personal wearable apparatuses, televisions, host computers for transportation, personal computers, digital cameras, handheld game consoles, and the like. However, as specification requirements such as resolution, narrow bezel, thinness, and the like are increasingly strict, display devices also face the challenge of optical design.

For example, in a liquid crystal display device, optical performance is usually closely related to the backlight module disposed behind a display panel. In some designs, a more collimated backlight source is required to match the front display panel, thereby achieving an expected optical effect. All traditional collimated-backlight designs are direct-type backlight modules. An optical film is disposed over a light source to adjust the collimation of emitted light. However, in this manner, the thickness of the module usually increases, or a large number of light sources need to be disposed. Therefore, the prior art has room for improvement.

SUMMARY

The present invention is intended to provide a backlight module and a display device. The backlight module has collimated or approximately collimated backlight.

The present invention is further intended to provide a backlight module to generate collimated or approximately collimated backlight with a smaller number of light sources.

The present invention is further intended to generate collimated backlight with an edge-light design.

The display device includes a backlight module and a display panel. The display panel is disposed at the side of the backlight module from which backlight is output. The backlight module includes a collimated light source and a light guide plate. The collimated light source provides collimated light. The light guide plate has a bottom surface and a top surface opposite to each other, and has a light entrance surface connected to the ends of the bottom surface and the top surface respectively. The light entrance surface is disposed toward the collimated light source to receive the collimated light from the collimated light source. The bottom surface inclines relatively to the top surface, and inclines toward the top surface from the end of the bottom surface connected to the light entrance surface.

A plurality of first grooves are disposed side by side on the bottom surface and respectively extends along the length direction of the light entrance surface. The first groove has a first light receiving surface closer to the light entrance surface. The first light receiving surface extends toward the top surface and inclines away from the light entrance surface and has a first end facing the top surface. Compared to the first end of the first light receiving surface closer to the light entrance surface, the first end of the first light receiving surface farther from the light entrance surface has a vertical projection position on the light entrance surface closer to the top surface. After entering the light guide plate from the light entrance surface, the collimated light may be reflected from a position on different first light receiving surfaces close to the first end to leave the light guide plate through the top surface, thereby forming collimated backlight.

DETAILED DESCRIPTION

Figure 1:
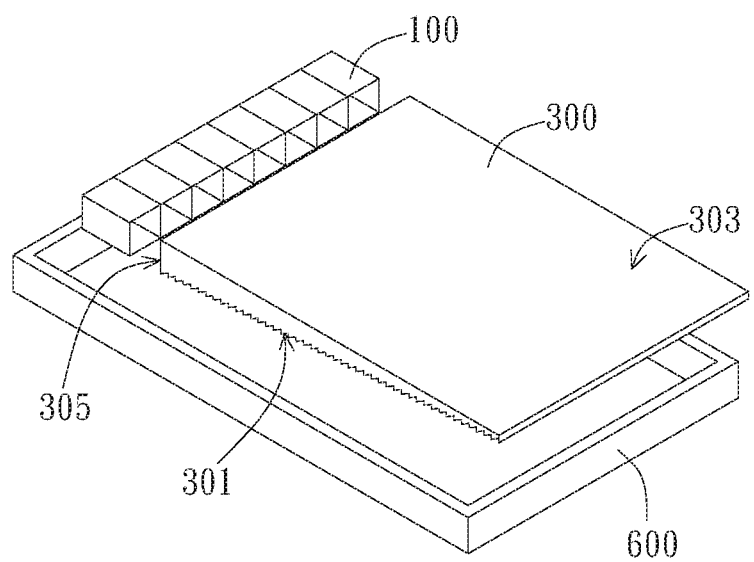
FIG. 1 is an exploded view of the components of an embodiment of a backlight module.

The following describes the implementation of the connection assembly disclosed in the present invention through specific detailed embodiments and with reference to the drawings. A person skilled in the art can understand the advantages and effects of the present invention through the content disclosed in this specification. However, the content disclosed below is not intended to limit the scope of the present disclosure. A person skilled in the art may implement the present invention through other different embodiments based on different views and applications without departing from the spirit of the present invention. In the attached drawings, the thicknesses of layers, films, panels, regions, and the like are amplified for the purpose of clarification. Throughout the specification, the same reference numerals indicate the same components. It should be understood that when a component such as a layer, film, region or substrate is referred to as "being on" or "being connected to" another component, they may be directly on or connected to another component, or there may be other elements therebetween. On the other hand, when a component is referred to as "being directly on" or "being directly connected to" another component, there is no element therebetween. As used in the present specification, a "connection" may be a physical and/or electrical connection. In addition, "electrical connection" or "coupling" means that other elements may exist therebetween.

It should be understood that even though terms such as "first", "second", and "third" in this specification may be used to describe various elements, parts, regions, layers, and/or portions, but these elements, parts, regions, layers, and/or portions are not limited by such terms. Such terms are only used to differentiate an element, part, region, layer, or portion from another element, part, region, layer, or portion. Therefore, in the following discussion, a first element, part, region, layer, or portion may be called a second element, part, region, layer, or portion, and do not depart from the teachings of the present invention.

In addition, relative terms such as "below", "bottom", "on" or "top" may be used to describe a relationship between an element and another element in this specification, as shown in the figures. It should be understood that such spatially relative terms are intended to encompass different orientations of the device in addition to the orientation depicted in the figures. For example, if a device in the figures is turned upside down, an element described as being "under" another element will then be "on top of" that element. Therefore, the exemplary term "under" encompasses both the below and above orientations depending on the spatial orientation of the device. Similarly, if the device in the figures is turned upside down, an element described as being "below" or "lower" relative to another element will then be "above" the other element. Therefore, the exemplary term "under" or "lower" encompasses both the above and below orientations.

The terms "about", "approximately", or "essentially" used in the present specification include the value itself and the average values within the acceptable range of deviation of the specific values as confirmed by a person having ordinary skill in the art, considering the specific measurement discussed and the amount of errors related to such measurement (that is, the limitations of the measurement system). For example, "about" may mean within one or more standard deviations of the value itself, or within ±30%, ±20%, ±10%, ±5% of the stated value. Further, "about", "approximately", or "essentially" used in the present specification may select a more acceptable range of deviations or standard deviations based on optical properties, etching properties, or other properties. One cannot apply one standard deviation to all properties.

The present invention provides a backlight module that may be preferably applied to a display device. The present invention further provides a display device using the backlight module. The display device preferably includes a non-spontaneous display panel such as a liquid crystal display panel or an electrophoretic display panel, and may be preferably applied to computer displays, televisions, monitors, and host computers in vehicles. In addition, the display device may also be applied to other electronic apparatuses, such as being used as a display screen in a mobile phone, a digital camera, a handheld game console, or the like.

FIG. 1 is a three-dimensional exploded view of an embodiment of a backlight module. As shown in FIG. 1, the backlight module 10 includes a collimated light source 100 and a light guide plate 300. The collimated light source 100 provides collimated light. The collimated light is incident on the light guide plate 300. Preferably, the traveling directions of the collimated light are parallel or approximately parallel. The collimated light may be generated by a light emitting diode or other light sources, and is then adjusted through a lens or other apparatuses to be collimated. The light guide plate 300 has a bottom surface 301 and a top surface 303 opposite to each other, and has a light entrance surface 305 connected to ends of the bottom surface 301 and the top surface 303 respectively. The light entrance surface 305 faces toward a side at which the collimated light source 100 outputs light, to receive the collimated light from the collimated light source 100, so that the collimated light enters the light guide plate 300. After the collimated light enters the light guide plate 300 from the light entrance surface 305, at least a portion of the light is emitted from the top surface 303 after being reflected from the bottom surface 301 to leave the light guide plate 300. In an embodiment, the backlight module may further include a housing 600. The light guide plate 300 is disposed in the housing 600. The housing 600 is made of, for example, a light-absorbing material to absorb stray light that is deflected, thereby increasing collimation of the light.

Figure 2:
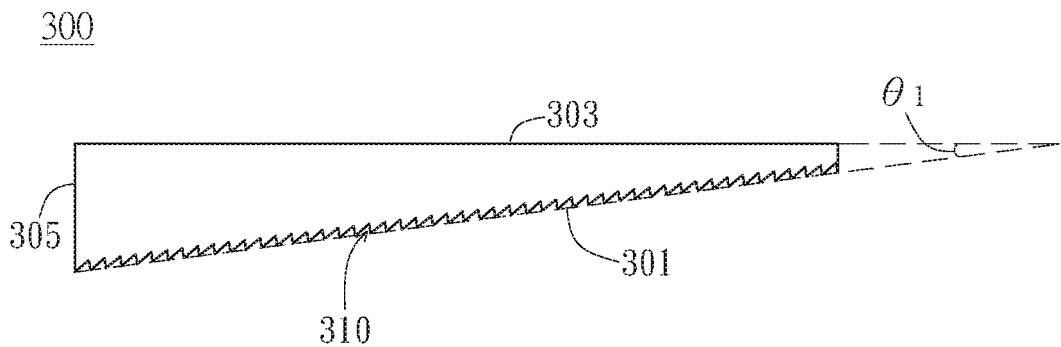
FIG. 2 is a cross-sectional view of an embodiment of a light guide plate.

FIG. 2 is a schematic cross-sectional view of the light guide plate 300 in the backlight module embodiment shown in FIG. 1. As shown in FIG. 2, the top surface 303 is, for example, a plane, and is essentially perpendicular to the light entrance surface 305. In addition, the bottom surface 301 inclines relative to the top surface 303, and inclines toward the top surface 303 from an end of the bottom surface connected to the light entrance surface 305. In other words, a portion of the bottom surface 301 farther from the light entrance surface 305 is closer to the top surface 303. A first angle $\theta_1$ exists between the direction in which the bottom surface 301 extends and the direction in which the top surface 303 extends. In an embodiment, the first angle $\theta_1$ is not greater than five degrees; for example, it may range between one to two degrees. The direction in which the bottom surface 301 extends may be preferably represented by an extension of the line between the two ends of the bottom surface 301.

As shown in FIG. 2, a plurality of first grooves 310 are provided on the bottom surface 301. The first grooves 310 are disposed side by side and respectively extend along the length direction of the light entrance surface 305 (that is, the direction into the paper in FIG. 2). In other words, since the bottom surface 301 inclines relative to the top surface 303, a first groove 310 closer to the light entrance surface 305 indicates a longer distance to the top surface 303. The first groove 310 may be formed on the bottom surface 301 by rolling, printing, cutting, etching or other physical or chemical processes.

Figure 3:
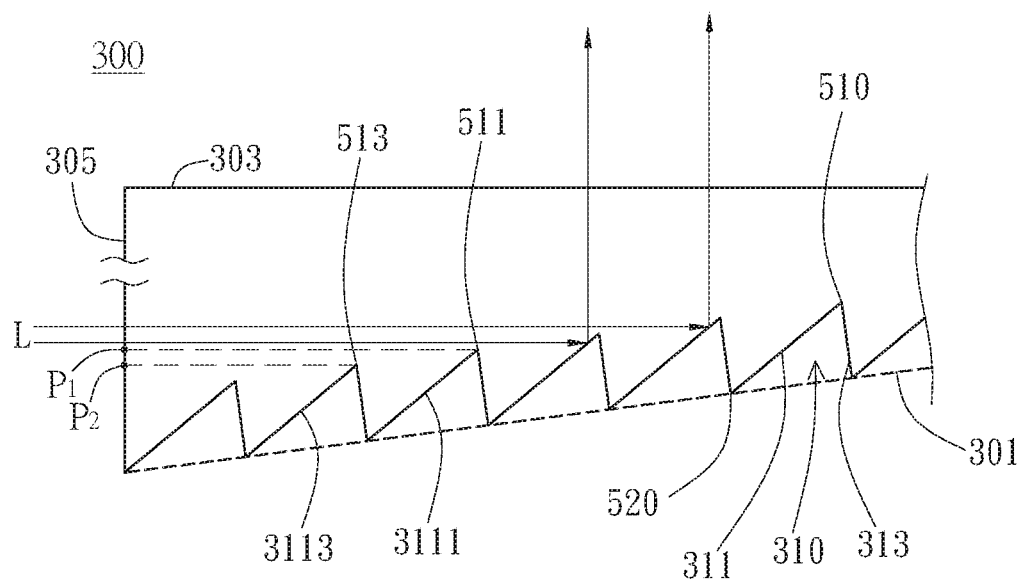
FIG. 3 is a partial enlarged view of the embodiment shown in FIG. 2.

FIG. 3 is a partially enlarged view of the cross-section shown in FIG. 2. As shown in FIG. 3, the first groove 310 may have a first light receiving surface 311 closer to the light entrance surface 305 and a first wall surface 313 farther from the light entrance surface 305. The first light receiving surface 311 extends toward the top surface 303 and away from the light entrance surface 305. The first light receiving surface 311 has a first end 510 toward the top surface 303. That means, the first light receiving surface 311 inclines relative to the light entrance surface 305, and the closer it is to the concaved bottom of the first groove 310 means the farther it is to the light entrance surface 305. The first light receiving surface 311 is, for example, a plane, but the present invention is not limited thereto. In addition, the length side of the length direction (the direction into the paper) of the first light receiving surface 311 is parallel to the length direction of the light receiving surface 305.

As shown in FIG. 3, in this embodiment, an end of the first wall surface 313 is connected to the first end 510. Therefore, the first wall surface 313 and the first light receiving surface 311 together form, for example, a V-shaped cross-section trough. A connection point between the end of the first wall surface 313 and the first end 510 is a valley bottom position of the V-shaped cross-section trough, and the trough extends along the length direction (the direction into the paper) of the light entrance surface 305. In addition, in this embodiment, the first light receiving surface 311 has a second end 520 opposite to the first end 510. At least some of the second ends 520 are connected to an end of the first wall surface 313 of another adjacent one of the first grooves 310, to form a ridgeline. In this embodiment, since each of the first grooves 310 is closely connected to an adjacent first groove 310, except the first groove 310 located at edge, the second ends 520 of other first light receiving surfaces 311 are all connected to the first wall surface 313 of the adjacent first groove 310, except the first light receiving surface 311 provided at the edge. However, in different embodiments, some adjacent first grooves 310 may not be closely connected due to, for example, a plane structure existing therebetween. Therefore, the second end 520 of the first light receiving surface 311 may also not be connected to the first wall surface 313 of the adjacent first groove 310. Therefore, some other second ends 520 may be connected to ends of the first wall surface 313 of another adjacent first grooves 310 to form a ridgeline. Correspondingly, due to the same reason, some ends of the first wall surfaces 313 may also be connected to the second end 520 of the first light receiving surface 311 in adjacent first grooves 310. On the cross-section shown in FIG. 3, the first light receiving surface 311 and the first wall surface 313 of one first groove 310 do not necessarily have the same length. In addition, it is not necessary for the angles between the first light receiving surface and the top surface 303 or the bottom surface 301 and the angles between the first wall surface and the top surface 303 or the bottom surface 301 to be symmetrical with each other.

As shown in FIG. 3, a first light receiving surface 3111 is farther from the light entrance surface 305 than another first light receiving surface 3113. A first end 511 of the first light receiving surface 3111 has a vertical projection $P_1$ on the light entrance surface 305, and a first end 513 of the first light receiving surface 3113 has a vertical projection $P_2$ on the light entrance surface 305. The vertical projection $P_1$ is closer to the top surface 303 than the vertical projection $P_2$. Specifically, the vertical projection $P_1$ and the vertical projection $P_2$ are two projection lines on the light entrance surface 305, and the distance between the vertical projection $P_1$ and the top surface 303 is less than the distance between the vertical projection $P_2$ and the top surface 303. Through the arrangement, with respect to collimated light L from the light entrance surface 305, the rear first light receiving surface 3111 is higher than the front first light receiving surface 3113. After entering the light guide plate 300 from the light entrance surface 305, the collimated light L may be reflected from a position on different first light receiving surfaces 311 close to the first end 510 toward the top surface 303. In other words, although partial light passes over the first end 513 of the front first light receiving surface 3113, the light may still be reflected by the rear first light receiving surface 3111. Therefore, the incident collimated light may be reflected at different positions of the light guide plate 300 to achieve uniformity of the light while maintaining a collimating characteristic. Through the disposition, the collimated backlight may be generated without a direct-type backlight design, thereby reducing the amount of light sources used.

Figure 4:
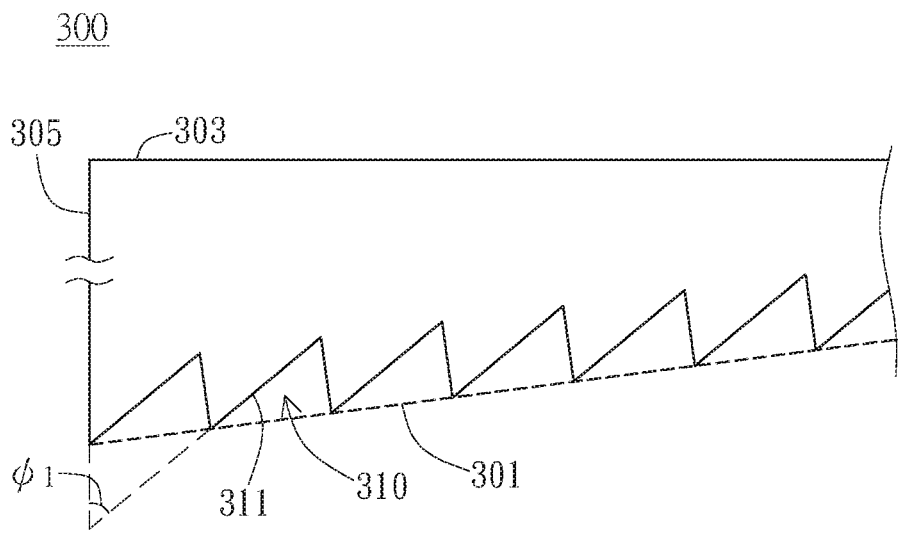
FIG. 4 is a partial enlarged view of the embodiment shown in FIG. 2.

As shown in FIG. 4, on the cross-section, a first acute angle $\phi_1$ exists between the direction in which the first light receiving surface 311 extends and the direction in which the light entrance surface 305 extends. Preferably, the first acute angle $\phi_1$ equals to 45 degrees. However, in different embodiments, the first acute angle $\phi_1$ may also be greater than or less than 45 degrees, for example, the first acute angle $\phi_1$ is between 30 degrees to 60 degrees.

Figure 5:
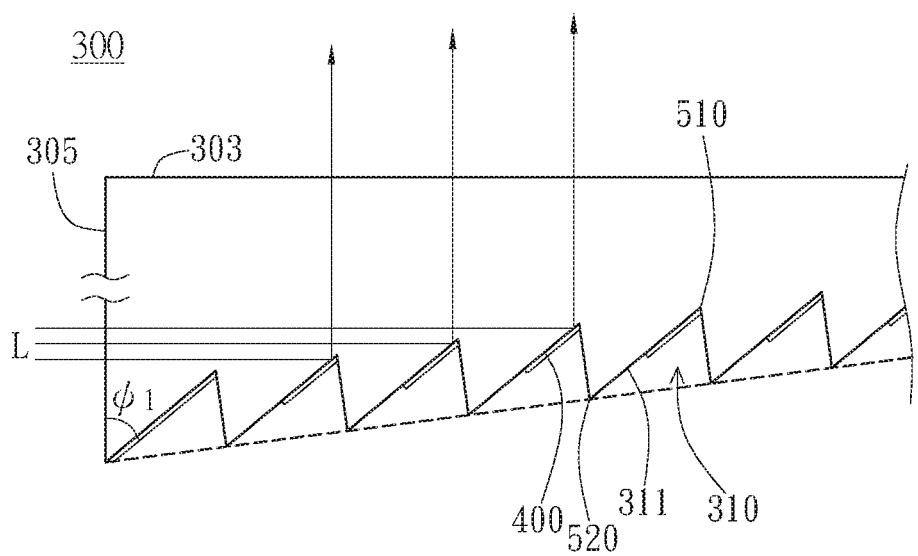
FIG. 5 is a cross-sectional view of an embodiment of another light guide plate.

FIG. 5 illustrates another embodiment of the light guide plate 300. In this embodiment, a reflective material 400 may be disposed on the first light receiving surface 311. The reflective material 400 may be metal or other materials, and may be disposed on the first light receiving surface 311 through coating, pasting, or other manners. In addition, the reflective material 400 may be disposed on a portion or all of the surface of the first light receiving surface 311. As shown in FIG. 5, the reflective material 400 is disposed on a portion of the first light receiving surface 311. The reflective material covers the first end 510 but does not extend to the second end 520. In this embodiment, with respect to incident collimated light, the reflective material covers at least a portion of the first light receiving surface 311 protruding from the first end 510 of the front first light receiving surface 311. Through the arrangement, the light reflection effect of the first light receiving surface 311 can be further enhanced, and the first acute angle $\phi_1$ is less restricted by a critical angle of the material of the light guide plate 300.

Figure 6:
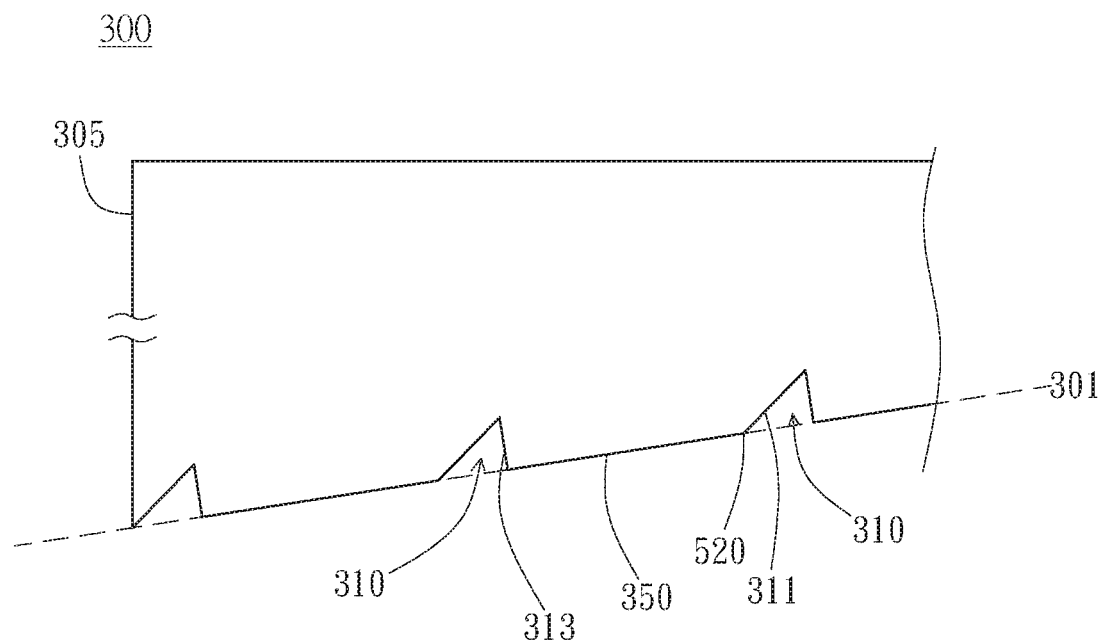
FIG. 6 is a cross-sectional view of an embodiment of another light guide plate.

FIG. 6 illustrates another embodiment of a light guide plate. In this embodiment, a connecting surface 350 is disposed between two adjacent first grooves 310. In other words, the second end 520 of the first light receiving surface 311 is not directly connected to the end of the first wall surface 313 of the front first groove 310, but the second end 520 and the end of the first wall surface 313 are connected respectively through the connecting surface 350. In an embodiment, a plurality of connecting surfaces 350 are parallel to each other. In addition, the plurality of connecting surfaces 350 may be a coplanar to form a bottom surface 301. In different embodiments, different connecting surfaces 350 may also have different widths. For example, a longer distance to the light entrance surface 305 may lead to a smaller width of the connecting surface 350, to increase the distribution density of the first grooves 310.

Figure 7:
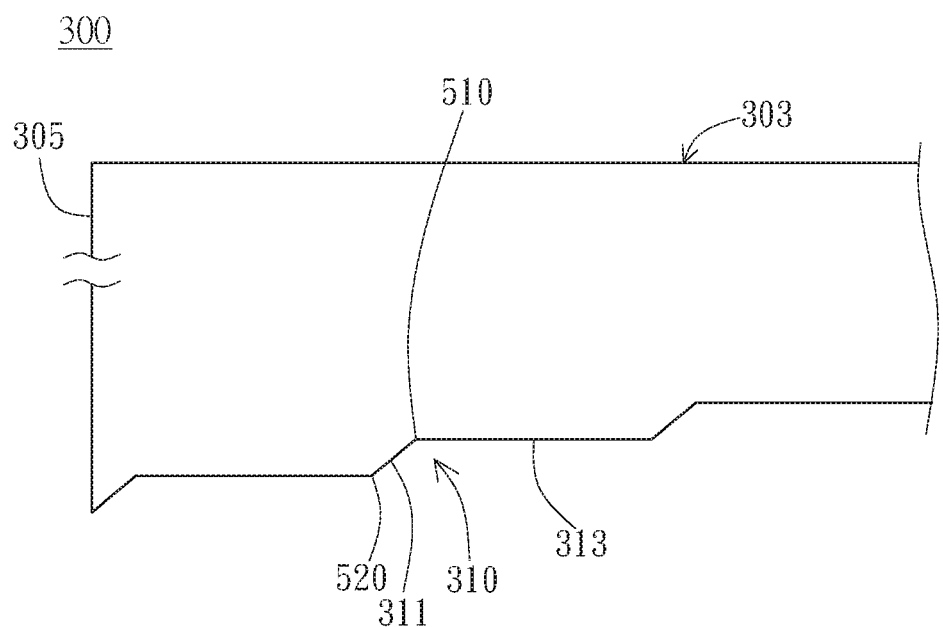
FIG. 7 is a cross-sectional view of an embodiment of another light guide plate.

FIG. 7 illustrates another embodiment of the light guide plate 300. In this embodiment, the first wall surface 313 is essentially perpendicular to the light entrance surface 305 or parallel to the top surface 303. Two ends of the first wall surface 313 are respectively connected to the first end 510 of the front first light receiving surface 311 (relative to the light entrance surface 305) and the second end 520 of the rear first light receiving surface 311. Since the first wall surface 313 is essentially perpendicular to the light entrance surface 305, a base angle of a V-shaped cross-section formed between the first wall surface and the first light receiving surface 311 is an obtuse angle greater than 90 degrees. The distribution density of the first grooves 310 may be preferably changed merely through adjusting the length of the first wall surface 313.

Figure 8:
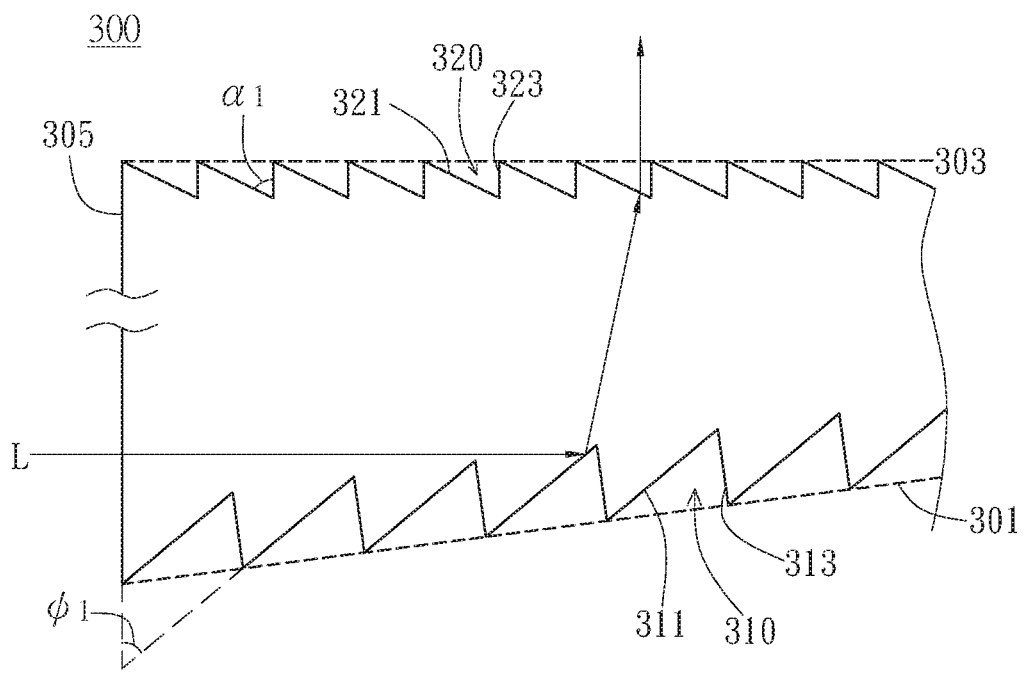
FIG. 8 is a cross-sectional view of an embodiment of another light guide plate with a groove provided on the top surface.

FIG. 8 illustrates another embodiment of a light guide plate 300. In this embodiment, the first acute angle $\phi_1$ between the first light receiving surface 311 and the light entrance surface 305 is greater than 45 degrees. In addition, a plurality of second grooves 320 are provided on the top surface 303. The second grooves 320 are disposed side by side and respectively extend along the length direction of the light entrance surface 305 (that is, the direction into the paper in FIG. 8). The second groove 320 may be formed on the top surface 303 by rolling, printing, cutting, etching or other different physical or chemical processes. As shown in FIG. 8, the second groove 320 has a second light receiving surface 321 closer to the light entrance surface 305. The second light receiving surface 321 extends toward the bottom surface 301 and inclines away from the light entrance surface 305. Therefore, the closer it is to the concaved bottom of the second groove 320 means the farther it is to the light entrance surface 305. The second light receiving surface 321 is, for example, a plane, but the present invention is not limited thereto. In addition, the length side of the length direction (the direction into the paper) of the second light receiving surface 321 is parallel to the length direction of the light entrance surface 305. In addition, the direction in which the top surface 303 extends may be preferably represented by extending the line between the two ends of the top surface 303.

In this embodiment, after the collimated light L is reflected by the first light receiving surface 311, the direction in which the collimated light L travels is preferably the direction in which the collimated light L extends toward the top surface 303 while being deflected away from the light entrance surface 305. When the light arrives at the second light receiving surface 321, the light may be refracted due to the inclination angle of the second light receiving surface 321, so as to be guided to emit light toward the direction approximately perpendicular to the top surface 303.

As shown in FIG. 8, the second groove 320 has a second wall surface 323 farther from the light entrance surface 305. The second wall surface 323 is connected to an end of the second light receiving surface 321, for example, to form a V-shaped cross-section groove. In an embodiment, the second wall surface 323 is, for example, parallel to the light entrance surface 305 to reduce contact between the reflected light and the second wall surface 323, but the present invention is not limited thereto. An angle between the second wall surface 323 and the light entrance surface 305 may also be designed to reduce the contact between the reflected light and the second wall surface 323.

In addition, in an embodiment, an angle $\alpha_1$ between the second wall surface 323 and the second light receiving surface 321 is, for example, $$90 \text{ degrees}-\text{abs}(\text{atan}(n^*\sin(\theta)/(1-n^*\cos(\theta)))), \text{ where}$$

n is the refractive index of the light guide plate, and
θ=abs ((the first acute $\phi_1$)*2-90 degrees).

Through the aforementioned design, the reflected light may be guided back to the light emitting angle approximately perpendicular to the top surface 303. In addition, the efficiency of light may be improved through reducing the likelihood of the light arriving at the second wall surface 323.

Figure 9:
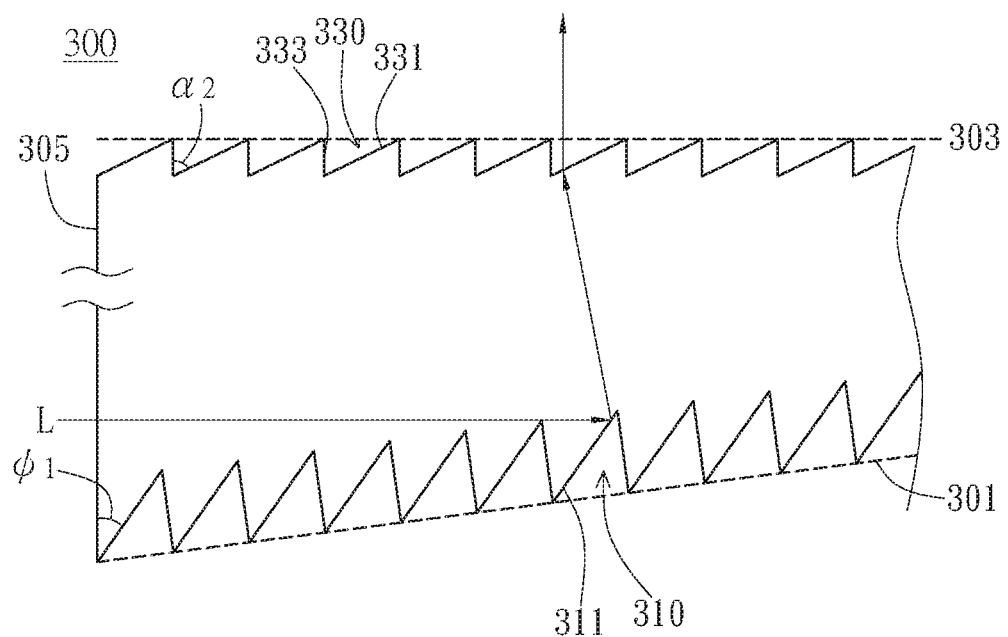
FIG. 9 is a cross-sectional view of an embodiment of another light guide plate with a groove provided on the top surface.

FIG. 9 illustrates another embodiment of a light guide plate 300. In this embodiment, the first acute angle between the first light receiving surface 311 and the light entrance surface 305 is less than 45 degrees. In addition, a plurality of third grooves 330 are provided on the top surface 303. The third grooves 330 are disposed side by side and respectively extend along the length direction of the light entrance surface 305 (that is, the direction into the paper in FIG. 9). The third groove 330 may be formed on the top surface 303 by rolling, printing, cutting, etching or other different physical or chemical processes. As shown in FIG. 9, the third groove 330 has a third light receiving surface 331 farther from the light entrance surface 305. The third light receiving surface 331 extends toward the bottom surface 301 and inclines toward the light entrance surface 305. Therefore, the closer it is to the concaved bottom of the third groove 330 means the closer it is to the light entrance surface 305. The third light receiving surface 331 is preferably a plane, but the present invention is not limited thereto. In addition, the length side of the length direction (the direction into the paper) of the third light receiving surface 331 is parallel to the length direction of the light entrance surface 305.

In this embodiment, after the collimated light is reflected by the first light receiving surface 311, the direction in which the collimated light travels is preferably the direction in which the collimated light extends toward the top surface 303 while approaching the light entrance surface 305. When the light arrives at the third light receiving surface 331, the light may be refracted due to an inclination angle of the third light receiving surface 331, so as to be guided to emit light toward a direction approximately perpendicular to the top surface 303.

As shown in FIG. 9, the third groove 330 has a third wall surface 333 closer to the light entrance surface 305. The third wall surface 333 is connected to an end of the third light receiving surface 331, for example, to form a V-shaped cross-section groove. In an embodiment, the third wall surface 333 is, for example, parallel to the light entrance surface 305 to reduce contact between the reflected light and the third wall surface 333, but the present invention is not limited thereto. An angle between the third wall surface 333 and the light entrance surface 305 may also be designed to reduce the contact between the reflected light and the third wall surface 333.

In addition, in an embodiment, an angle $\alpha_2$ between the third wall surface 333 and the third light receiving surface 331 is, for example, $$90 \text{ degrees}-\text{abs}(\text{atan}(n^*\sin(\theta)/(1-n^*\cos(\theta)))), \text{ where}$$

n is the refractive index of the light guide plate, and
θ=abs(90 degrees−(first acute $\phi_1$)*2).

Through the aforementioned design, the reflected light may be guided back to the light emitting angle approximately perpendicular to the top surface 303. In addition, the efficiency of light may be improved through reducing the likelihood of the light arriving at the third wall surface 333.

Figure 10:
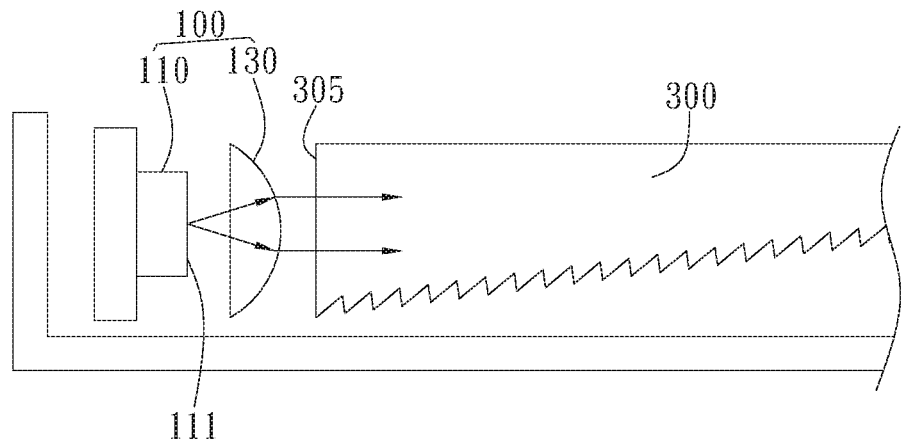
FIG. 10 is a cross-sectional view of an embodiment of a collimated light source.

FIG. 10 illustrates an embodiment of a collimated light source. In this embodiment, the collimated light source 100 includes a light source 110 and a collimating lens 130. The light source 110 is preferably a light emitting diode chip, but the present invention is not limited thereto. In addition, a plurality of light sources 110 may be disposed on an elongated circuit board to form a light bar. Each of the light source 110 has a light emitting surface 111. The collimating lens 130 is disposed between the light emitting surface 111 and the light entrance surface 305 of the light guide plate 300. The collimating lens 130 is preferably a Fresnel lens, but the present invention is not limited thereto. Light generated by the light source 110 from the light emitting surface 111 has, for example, a cone-shaped light field, that is, the light field spreads in a shape outward. After the light passes through the collimating lens 130, the directions in which the light travels are guided to be approximately parallel, so as to generate an approximately collimating effect.

Figure 11:
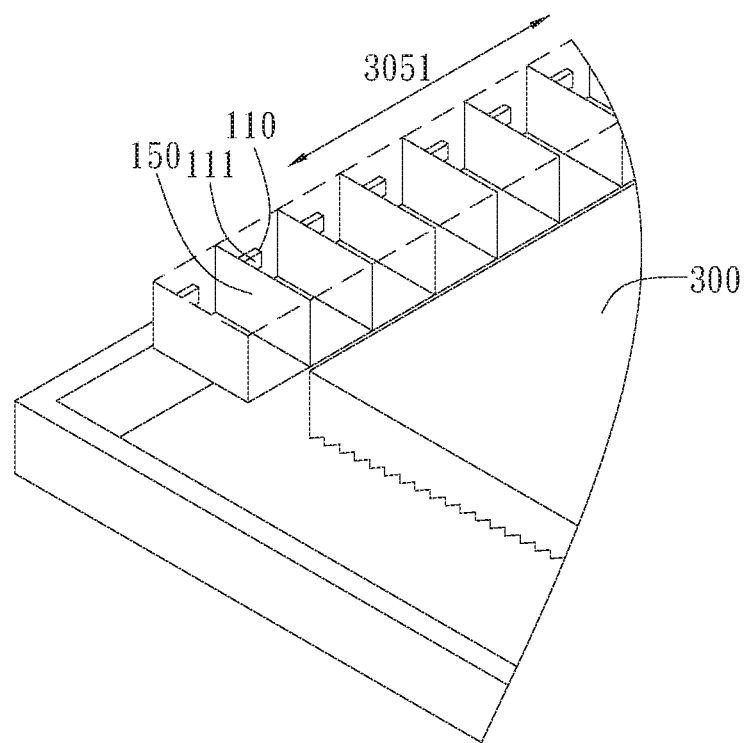
FIG. 11 is a cross-sectional view of an embodiment of another collimated light source.

FIG. 11 illustrates another embodiment of a collimated light source. In this embodiment, the collimated light source 100 includes a plurality of light sources 110 and a plurality of spacer plates 150. The plurality of light sources 110 are distributed along a length direction 3051 of the light entrance surface 305. For example, the light sources may be disposed on an elongated circuit board parallel to the light entrance surface 305 to form a light bar. The plurality of spacer plates 150 are preferably disposed side by side in parallel, so that a plurality of elongated compartments may be formed. The plurality of light sources 110 are respectively located at an end of the compartments. In other words, each of the spacer plates 150 is disposed between two adjacent light sources 110 and extends between the light emitting surface 111 of the light source 110 and the light entrance surface 305 of the light guide plate 300. The spacer plates 150 are made of a light-absorbing material. Therefore, when light leaving the light-emitting surface 111 is in contact with the spacer plates 150, a portion or all of the light is not reflected as a result of being absorbed by the spacer plates 150. In other words, most or all of the light leaving the elongated compartments and arriving at the light entrance surface 305 is collimated light. In addition, in combination with the previous embodiment, the collimating lens 130 in FIG. 10 is disposed in each compartment so as to further improve a collimating effect.

Figure 12:
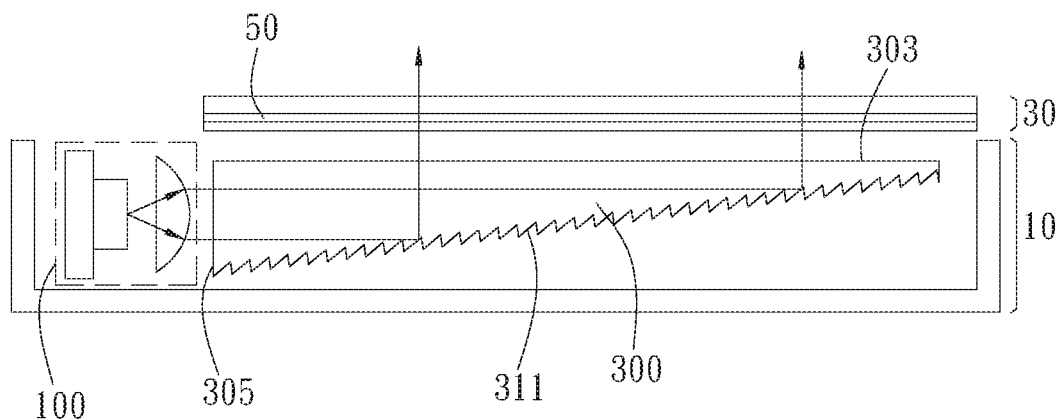
FIG. 12 is a cross-sectional view of an embodiment of a display device.

FIG. 12 is a display device including the aforementioned backlight module. As shown in FIG. 12, the display device includes a backlight module 10 and a display panel 30. The display panel 30 is disposed on the top surface 303 of the light guide plate 300. In an embodiment, after collimated light enters the light guide plate 300 and passes through the top surface 303 through reflection by the first light receiving surface 311, the light directly enters the display panel 30. In other words, no additional optical films, such as a diffusion film or a brightness enhancement film of the backlight module is disposed between the top surface 303 and the display panel 30. However, a film, such as a polarizer required for the display panel 30 to control image display may still be attached to the display panel 30. In addition, in this embodiment, for example, a quantum dot color film layer 50 is disposed in the display panel 30. When collimated light enters the quantum dot color film layer 50, quantum dots in the quantum dot color film layer are excited to generate light of different colors to meet the requirements for color display. Collimated light has better collimation, the collimated light is less likely to leak light than a stray light source. Therefore, light of unexpected color generated when leaked light irradiates quantum dots in unintended areas may be reduced, thereby improving purity of each color displayed in each pixel.

Through the aforementioned design, a collimated backlight effect may be achieved with a smaller number of light sources. Especially when the display device has a relatively large size, the aforementioned design helps reduce an amount of light sources used and saves energy.

The present invention has been described by using the foregoing related embodiments. However, the foregoing embodiments are only examples for implementing the present invention. It should be noted that the disclosed embodiments do not limit the scope of the present invention. On the contrary, the present invention is intended to cover modifications and equivalent arrangements included within the spirit and scope of the appended claims.

What is claimed is:

1. A backlight module, comprising:
a collimated light source configured to generate a collimated light; and
a light guide plate having a bottom surface and a top surface opposite to each other and a light entrance surface connected to an end of the bottom surface and an end of the top surface respectively, the light entrance surface being disposed toward the collimated light source for receiving the collimated light,
wherein, the bottom surface inclines toward the top surface from the end of the bottom surface connected to the light entrance surface, and a first angle exists between an extending direction of the bottom surface and an extending direction of the top surface, a plurality of first grooves are disposed side by side on the bottom surface and respectively extend along a length direction of the light entrance surface, each of the first grooves has a first light receiving surface closer to the light entrance surface, and each of the first light receiving surfaces extends toward the top surface and inclines away from the light entrance surface, and each of the first light receiving surfaces has a first end facing the top surface, wherein compared to a vertical projection of the first end of the first light receiving surface closer to the light entrance surface on the light entrance surface, a vertical projection of the first end of the first light receiving surface farther from the light entrance surface has a vertical projection on the light entrance surface is closer to the top surface, wherein a first acute angle exists between an extending direction of the first light receiving surface of each of the first grooves and an extending direction of the light entrance surface, the first acute angle is equal or larger than 45 degrees, a plurality of second grooves are disposed side by side on the top surface and respectively extend along the length direction of the light entrance surface, each of the second grooves has a second light receiving surface closer to the light entrance surface, and each of the second light receiving surfaces extends toward the bottom surface and inclines away from the light entrance surface, wherein each of the second grooves has a second wall surface farther from the light entrance surface and connected to the second light receiving surface, an angle between the second wall surface and the second light receiving surface is 90 degrees−abs(atan(n*sin(θ)/(1−n*cos(θ)))) (n: a refractive index of the light guide plate,θ=abs((the first acute angle)*2-90 degrees)).

2. The backlight module according to claim 1, wherein each of the first grooves has a first wall surface connected to the first light receiving surface, the first end of the first light receiving surface is connected to an end of the first wall surface to form a valley bottom position of a V-shaped cross-section trough.

3. The backlight module according to claim 2, wherein the first light receiving surface of each of the first grooves has a second end opposite to the first end, at least some of the second ends are connected to the first wall surface of another adjacent one of the first grooves.

4. The backlight module according to claim 1, wherein a connecting surface is provided between the two adjacent first grooves.

5. The backlight module according to claim 2, wherein the first wall surface of each of the first grooves is essentially perpendicular to the light entrance surface, an end of the first wall surface of each of the first grooves is connected to the first end, and another end of at least some of the first wall surfaces is connected to a second end of the first light receiving surface of another adjacent one of the first grooves opposite to the first end .

6. A backlight module, comprising:
a collimated light source configured to generate a collimated light; and
a light guide plate having a bottom surface and a top surface opposite to each other and a light entrance surface connected to an end of the bottom surface and an end of the top surface respectively, the light entrance surface being disposed toward the collimated light source for receiving the collimated light,
wherein, the bottom surface inclines toward the top surface from the end of the bottom surface connected to the light entrance surface, and a first angle exists between an extending direction of the bottom surface and an extending direction of the top surface, a plurality of first grooves are disposed side by side on the bottom surface and respectively extend along a length direction of the light entrance surface, each of the first grooves has a first light receiving surface closer to the light entrance surface, and each of the first light receiving surfaces extends toward the top surface and inclines away from the light entrance surface, and each of the first light receiving surfaces has a first end facing the top surface, wherein compared to a vertical projection of the first end of the first light receiving surface closer to the light entrance surface on the light entrance surface, a vertical projection of the first end of the first light receiving surface farther from the light entrance surface has a vertical projection on the light entrance surface is closer to the top surface, wherein a first acute angle exists between an extending direction of the first light receiving surface of each of the first grooves and an extending direction of the light entrance surface, the first acute angle is less than 45 degrees, a plurality of third grooves are disposed side by side on the top surface and respectively extend along the length direction of the light entrance surface, each of the third grooves has a third light receiving surface farther from the light entrance surface, and each of the third light receiving surfaces extends toward the bottom surface and inclines toward the light entrance surface.

7. The backlight module according to claim 6, wherein each of the third grooves has a third wall surface closer to the light entrance surface and connected to the third light receiving surface, an angle between the third wall surface and the third light receiving surface is 90 degrees−abs(atan($n$*sin($\theta$)/(1−$n$*cos($\theta$))))

(n: a refractive index of the light guide plate, $\theta$=abs(90 degrees−(the first acute angle)*2)).

8. The backlight module according to claim 1, wherein a reflective material is provided on at least a portion of the first light receiving surface of each of the first grooves.

9. The backlight module according to claim 1, further comprising a housing, wherein the light guide plate is disposed in the housing, and the housing is made of a light-absorbing material.

10. The backlight module according to claim 1, wherein the collimated light source comprises:
  a light source having a light emitting surface; and
  a collimating lens disposed between the light emitting surface and the light entrance surface of the light guide plate.

11. The backlight module according to claim 1, wherein the collimated light source comprises:
  a plurality of light sources, each of the light sources having a light emitting surface; and
  a plurality of spacer plates respectively disposed between the two adjacent light sources, wherein each of the spacer plates extends between the light emitting surfaces and the light entrance surface of the light guide plate, and the spacer plates are made of a light-absorbing material.

12. A display device, comprising:
  the backlight module according to claims 1; and
  a display panel disposed on the top surface of the light guide plate.

13. The display device according to claim 12, wherein the collimated light is reflected by the first light receiving surface and then passes through the top surface so as to directly enter the display panel.

14. The display device according to claim 12, wherein the display panel comprises a quantum dot color film layer.

* * * * *